US 6,563,587 B1

(12) United States Patent
Bueschelberger et al.

(10) Patent No.: US 6,563,587 B1
(45) Date of Patent: May 13, 2003

(54) FIBER OPTIC SAGNAC INTERFEROMETER WITH SPATIAL FILTER

(75) Inventors: Hanns J. Bueschelberger, Kirchzarten (DE); Manfred Kemmler, Vorstetten (DE)

(73) Assignee: Litef GmbH (DE)

( * ) Notice: Subject to any disclaimer, the term of this patent is extended or adjusted under 35 U.S.C. 154(b) by 0 days.

(21) Appl. No.: 09/601,145

(22) PCT Filed: Jan. 15, 1999

(86) PCT No.: PCT/EP99/00218

§ 371 (c)(1),
(2), (4) Date: Jul. 27, 2000

(87) PCT Pub. No.: WO99/39159

PCT Pub. Date: Aug. 5, 1999

(30) Foreign Application Priority Data

Jan. 28, 1998 (DE) .......................... 198 03 223

(51) Int. Cl.$^7$ .............................................. G01C 19/72
(52) U.S. Cl. ........................................... 356/460
(58) Field of Search ................... 356/460, 462, 356/464

(56) References Cited

U.S. PATENT DOCUMENTS

| | | | | |
|---|---|---|---|---|
| 4,480,915 A | * | 11/1984 | Arditty et al. ............... | 356/460 |
| 4,875,775 A | * | 10/1989 | Michal et al. ............... | 356/464 |
| 4,944,591 A | | 7/1990 | McMichael | |
| 5,137,360 A | | 8/1992 | Ferrar | |
| 5,141,316 A | * | 8/1992 | Lefevre et al. ............. | 356/464 |
| 5,331,404 A | | 7/1994 | Moeller et al. | |
| 5,365,337 A | | 11/1994 | Page et al. | |
| 5,377,283 A | * | 12/1994 | Blake et al. ................ | 356/460 |

FOREIGN PATENT DOCUMENTS

| | | |
|---|---|---|
| DE | 3446663 | 7/1986 |
| DE | 4223740 | 1/1994 |
| EP | 0474389 | 3/1992 |

OTHER PUBLICATIONS

Article: "Polarization and Depolarization in the Fiber–Optic Gyroscope" by R. Ulrich, *Selected Papers on Fiber Optic Gyroscopes* (SPIE Milestone Series, vol. MS 8) (Jan. 1, 1982).
Article: "Progress in Optical Fiber Gyroscopes Using Integrated Optics" by H.Lefevre, J. Bettini, S. Vatoux and M. Papuchon, *Selected Papers on Fiber Optic Gyroscopes* (SPIE Milestones Series, vol. MS 8) (Jan. 13, 1985).

* cited by examiner

*Primary Examiner*—Samuel A. Turner
(74) *Attorney, Agent, or Firm*—Elliott N. Kramsky

(57) ABSTRACT

In a fibre-optic Sagnac interferometer, in particular for determining rotational speeds (fibre gyro), having an optical directional coupler (3) which is located in the light path from a light source (1) and whose at least one output is connected via a spatial filter (6) and a polarization filter (7) to a beam splitter (8) which, on the one hand, splits the light transmitted by the polarization filter (7) into two component light beams which are irradiated into the two ends of an optical fibre (9), it being the case, on the other hand, that the component light beams returning after traversing the optical fibre (9) are reunited in an interfering fashion and applied to a light-sensitive receiver (5), it is provided for the purpose of reducing the amplitude error, that is to say, the polarization ratio of the light upstream of the polarization filter (7), to produce the spatial filter (6) from monomode fibre. It is possible, in particular, as a result to save substantial costs in the case of the optical directional coupler (3), which can now be fabricated from simple monomode fibre.

2 Claims, 3 Drawing Sheets

FIBER OPTIC SAGNAC INTERFEROMETER WITH SPATIAL FILTER

BACKGROUND

1. Field of the Invention

The present invention relates to apparatus for measurement of rotation rate. More particularly, the invention pertains to improved fiber optic Sagnac interferometers.

2. Description of the Prior Art

Fiber optic Sagnac interferometers, especially those for determining rotational speed (fiber gyroscopes) are currently often constructed in a reciprocal minimum configuration. This optical architecture is known from the literature and may be described below briefly with the aid of FIG. 3.

A light source 1 (e.g. a superluminescent LED (SLD)) is connected to a coupler 3 through an optical fiber 2. In the reverse direction (i.e., the direction opposite to the light irradiated by the source 1), a light-sensitive detector 5 (also known as a receiver) is connected to the coupler 3 through an optical fiber 4.

Irradiated light reaches a beamsplitter 8 through a spatial filter 6 and a polarizer and polarization filter 7. The beamsplitter splits the incoming light approximately in half so that the optical fiber 9, connected at the two outputs of the beamsplitter 8 and preferably wound to form a coil, is penetrated by two counterrotating component light waves. After traversing the optical fiber 9, the component light waves are reunited in the beamsplitter 8, then traverse the polarization filter 7, the spatial filter 6, the coupler 3 and the optical fiber 4 to the receiver 5. A phase modulator 10 in the light path of the optical fiber 9 wound to form the coil insures a suitable operating point of the interferometer via an electronic control system (not shown).

Mathematical models for describing the sensor signal received at the receiver 5 have been devised by many scientists and authors. The signal errors that result from physical inadequacies have been described by error models (See, for example, Canadian patent 1,276,274.) Such error models distinguish amplitude and intensity errors of fiber gyroscopes for the optical arrangements described briefly above. Amplitude errors result from interference from waves that are orthogonally polarized upstream of the polarization filter 7 and transferred by cross coupling to the same polarization direction. Intensity errors result from interference from waves originally of the same polarization and rotated to the polarization direction by cross coupling.

An important parameter in the mathematical description of the amplitude error is the polarization ratio of the light upstream of the polarization filter, the polarizes. The larger the component to be suppressed by the polarizes, the greater the amplitude error. If the amplitude error becomes the dominant error component, the technical task is to reduce the latter.

In the prior art, it is known, for example, to use light sources that emit light with a large polarization factor. Using polarization-maintaining fibers, such polarized light can be directed to the polarizes so that the component of false polarization is small. If no polarization-maintaining fiber is employed, the light is generally completely depolarized to avoid a situation in which inadvertent rotation of the polarization direction can result in only a very small component of the light passing the downstream polarizes.

A substantial cost factor of the first-mentioned solution is that of the production of the coupler 3 (at the light source 1) and the light receiver 5 from polarization-maintaining fiber as fiber couplers of polarization-maintaining fiber are substantially more expensive than those of simple monomode fiber. In the latter case, depolarization of the light generates a large component of false polarization upstream of the polarization filter 7 that unfortunately amplifies the amplitude error.

SUMMARY AND OBJECTS OF THE INVENTION

It is therefore an object of the invention to reduce amplitude error substantially as the dominant error component in a fiber optic Sagnac interferometer.

It is a further object of this invention to achieve the above object without couplers of polarization-maintaining fiber.

The present invention achieves the preceding and other objects by providing an improvement in a fiber optic Sagnac interferometer of the type having a light source connected through an optical fiber to an input of an optical directional coupler. At least one output of the coupler is connected via a spatial filter and a polarization filter to a beamsplitter that splits the light transmitted by the polarization filter into two component beams. The component beams are irradiated into the two ends of an optical fiber. The beamsplitter reunites the component light beams returning after traversing the optical fiber through the other end of the optical fiber. The reunited component light beams are applied in reverse direction through the polarization filter, the spatial filter and the directional coupler to a light-sensitive receiver connected to the coupler. The improvement provided by the invention comprises the spatial filter being of polarizing monomode fiber.

The foregoing features of the invention are described in the detailed description that follows. Such description is accompanied by a set of drawing figures in which numerals, corresponding to those of the written description, identify the features of the invention with like numerals referring to like features throughout both the written description and the drawing figures.

DETAILED DESCRIPTION OF THE PREFERRED EMBODIMENT

Figure 1:
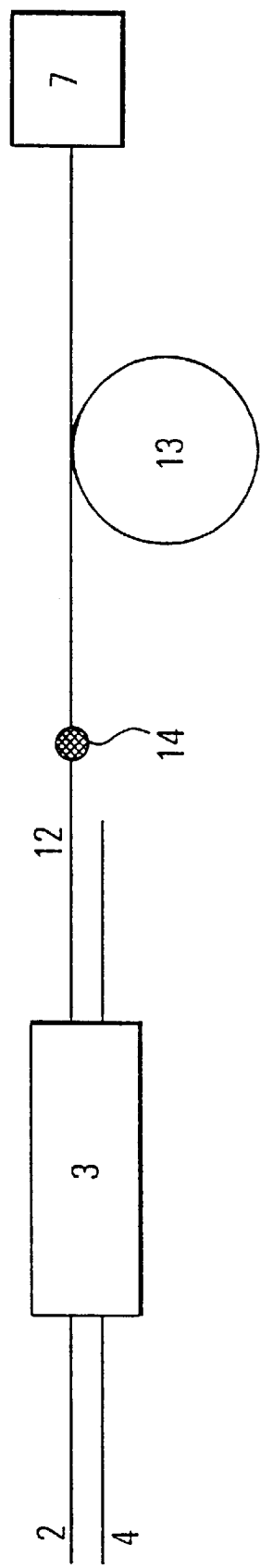
FIG. 1 is a schematic diagram of a portion of a Sagnac interferometer in accordance with the invention.
Figure 3:
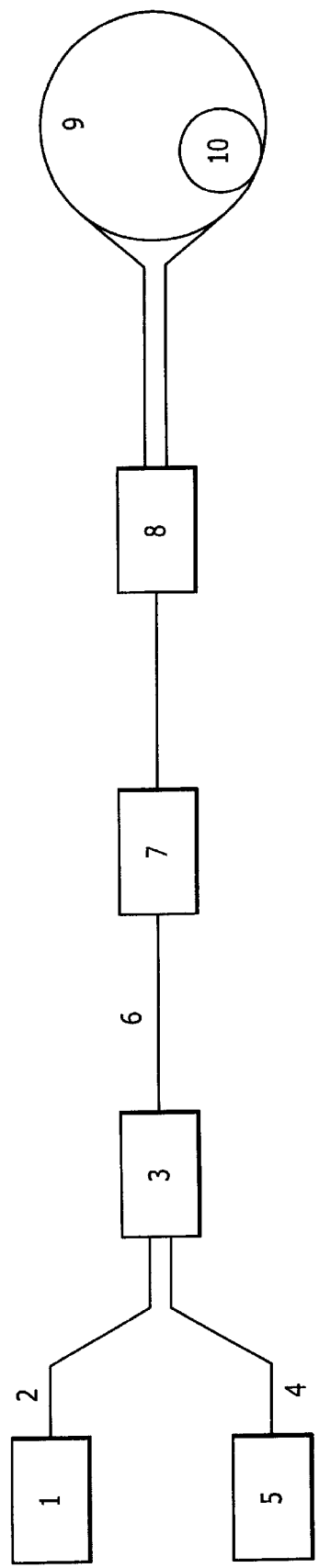
FIG. 3 is a basic schematic diagram of a Sagnac interferometer in accordance with the prior art.

FIG. 1 illustrates a partial section of the basic prior art configuration of FIG. 3, in which the directional coupler 3, with the supply leads 2 and 4, includes a waveguide connection 12 at the output side that is connected to the polarizer 7 through a junction 14 and a length of waveguide 13 of monomode fiber acting as a polarizing spatial filter.

Figure 2:
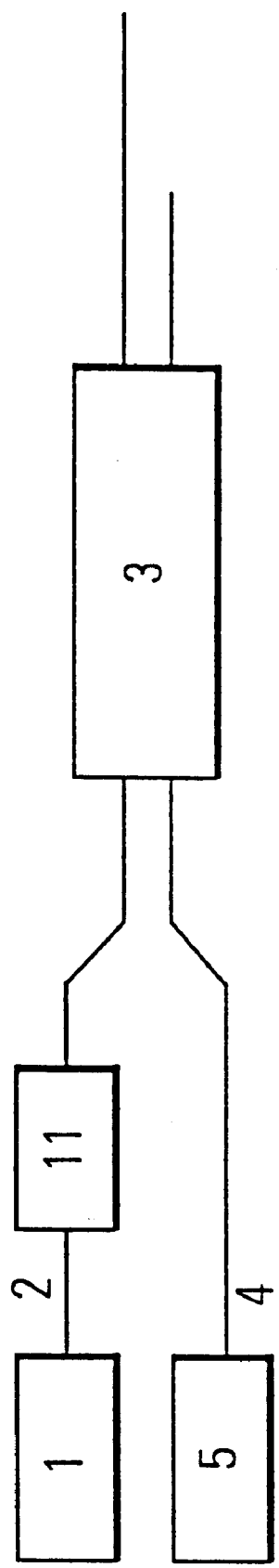
FIG. 2 is a schematic diagram of a portion of a Sagnac interferometer in accordance with an alternative embodiment of the invention.

In the alternative embodiment of FIG. 2, the light source 1 is connected to the corresponding input of the directional coupler 3 through a depolarizer 11.

By arranging a spatial filter of polarizing monomode fiber 12 between the directional coupler 3 (provided as a read-out coupler and designed, as a rule, as a 2×2 coupler to which the light source 1 and the light-sensitive receiver 5 are connected) and the polarizer 7, the spatial filter 12 suppresses undesired spatial natural oscillations of the light source 1.

In one of the embodiments, in which the spatial filter is made from a monomode fiber that strongly suppresses one of the two directions of polarization of the light and passes the other largely unchanged, the polarization ratio is changed in the desired manner if partially or completely depolarized light is present at the input of the spatial filter. The amplitude of the mode to be suppressed is then small at the input of the polarization filter. In principle, this arrangement requires no additional optical path components while necessitating only a special spatial filter embodiment (required in any case). A possible design variant consists in connecting the light source 1 to the assigned input of the directional coupler 3 through a depolarizer 11.

Polarizing fibers can be produced from birefringent monomode fibers. They provide their best effect when they are arranged in a circle of specific diameter. The cutoffs for the two directions of polarization occur at different wavelengths. If the wavelengths are positioned so that one polarization is strongly suppressed while the other polarization is only slightly damped, the length of fiber acts as a polarization filter. Such fiber polarizers are known and employed, inter alia, in fiber optic interferometers as polarization filters to insure the reciprocity of the optical path. In the fiber optic Sagnac interferometer, by contrast, another component is provided for such function, a polarization filter within a multifunctional integrated optics chip (IO chip).

The interconnection of a polarization filter and a spatial filter produced from a polarizing monomode fiber in accordance with the invention clearly reduces amplitude error and thereby contributes to improving the accuracy of a fiber optic Sagnac interferometer.

While this invention has been described with reference to its presently-preferred embodiment, it is not limited thereto. Rather, the invention is limited only insofar as it is defined by the following set of patent claims and includes within its scope all equivalents thereof.

What is claimed is:

1. In a fiber optic Sagnac interferometer of the type having a light source connected through an optical fiber to an input of an optical directional coupler, at least one output of which is connected via a spatial filter and a polarization filter to a beamsplitter that splits the light transmitted by the polarization filter into two component beams that are irradiated into the two ends of an optical fiber and reunites the component light beams returning after traversing the optical fiber through the other end of the optical fiber, said reunited component light beams being applied in reverse direction through said polarization filter, said spatial filter and said directional coupler to a light-sensitive receiver connected to said coupler, the improvement comprising said spatial filter being of monomode fiber forming a polarizer.

2. A fiber optic Sagnac interferometer as defined in claim 1 wherein said light source is connected through a depolarizer to the assigned input of said directional coupler.

* * * * *